United States Patent [19]

Weinberg et al.

[11] 4,254,241

[45] Mar. 3, 1981

[54] PROCESS FOR PRODUCING POLYOXYALKYLENE GLYCOL MODIFIED POLYESTERS

[75] Inventors: Kurt Weinberg, Upper Saddle River, N.J.; Gordon C. Johnson, Armonk, N.Y.

[73] Assignee: Union Carbide Corporation, New York, N.Y.

[21] Appl. No.: 102,833

[22] Filed: Dec. 12, 1979

[51] Int. Cl.$^3$ .................... C08L 67/02; C08L 71/02
[52] U.S. Cl. .................................. 525/408; 528/279; 528/281; 528/283; 528/285; 528/301
[58] Field of Search ............... 525/408; 528/279, 281, 528/283, 285, 301

[56] References Cited

U.S. PATENT DOCUMENTS

| | | | |
|---|---|---|---|
| 3,416,952 | 12/1968 | McIntyre et al. | 117/118 |
| 4,049,621 | 9/1977 | Gilkey et al. | 260/40 |
| 4,077,944 | 3/1978 | Weinberg et al. | 260/75 R |
| 4,116,942 | 9/1978 | Weinberg et al. | 528/283 |
| 4,143,057 | 3/1979 | Weinberg et al. | 260/429 R |
| 4,156,072 | 5/1979 | Weinberg et al. | 528/279 |

OTHER PUBLICATIONS

D. Coleman–Block Copolymers: Copolymerization of Ethylene Terephthalate and Polyoxyethylene Glycols–J.P.S. vol XIV pp. 15–28 (1954).

*Primary Examiner*—Carman J. Seccuro
*Attorney, Agent, or Firm*—Francis M. Fazio

[57] ABSTRACT

Improved process for producing polyesters and copolyesters modified with certain polyoxyalkylene glycols employs coordination complex catalysts of (I) a metal halide compound and certain silicon compounds or (II) a mixture of said coordination complex catalyst of said compounds with antimony diglycollate.

12 Claims, No Drawings

PROCESS FOR PRODUCING POLYOXYALKYLENE GLYCOL MODIFIED POLYESTERS

BACKGROUND OF THE INVENTION

The use of modifiers, such as the polyoxyalkylene glycols, to improve the dyeability of polyesters is well known. The prior art processes generally use metal salts such as lead oxide antimony acetate and antimony oxide as the polyesterification catalyst and may often require a prolonged period of time, which, at the high temperatures involved, may cause some decomposition of the modifier and impart undesirable properties to the finished product. The use of such salts as catalysts is illustrated in U.S. Pat. No. 3,416,952 and U.S. Pat. No. 4,049,621 and in an article by D. Coleman in the Journal of Polymer Science, Vol. XIV, pp. 15-28 (1954).

Recently there was discovered a new group of silicon containing catalysts for the production of polyesters, as disclosed in U.S. Pat. Nos. 4,116,942, 4,143,057 and 4,156,072.

SUMMARY OF THE INVENTION

It has now been unexpectedly discovered that certain silicon catalysts can be used in the production of polyoxyalkylene glycol-modified polyesters having better strength, better cold draw and better color at a faster rate than heretofore possible. In the process of this invention certain polyoxyalkylene glycols are used to achieve these improved properties and the results that have been obtained were completely unexpected and could not have been predicted from the prior art known to one skilled in the art.

DESCRIPTION OF THE INVENTION

In the production of polyesters and copolyesters the reaction is generally considered a dual or two-stage reaction. In the first stage esterification or transesterification occurs and in the second stage polycondensation occurs. This invention is concerned with the improvements achieved during the second stage of the reaction, which is generally conducted at temperatures up to about 325° C. In a typical reaction, the reactants and catalysts are added to the reactor and heated to undergo the initial transesterification and this is followed by the second polycondensation step. When a modifier is used, it is generally charged at the start of the reaction.

The modifiers used in the process of this reaction are the polyoxyalkylene glycols defined by the following formula:

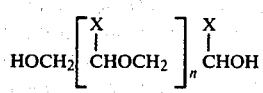

I wherein X is hydrogen or methyl; n has an average value of from about 4 to 250,000, preferably 4 to 5,000 and more preferably 4 to 800, when X is hydrogen; and n has an average of from about 4 to 1,000, preferably 6 to 500, when X is methyl.

Illustrative of such modifiers, many of which are commercially available, one can mention the polyoxyethylene glycols having an average molecular weight of from about 200 to about 10,000,000 or more, preferably from about 200 to about 1,000,000. Also useful are the polyoxypropylene glycols having an average molecular weight of from about 425 to about 4,000, or more. In addition, one can use the copoly-(oxyethylene-oxypropylene)glycols, random or blocked or capped, having an average molecular weight of from about 200 to 20,000, or more. The preferred are the polyoxyethylene glycols.

The polyoxyalkylene glycols can be used as modifiers at concentrations up to about 15 weight percent, generally from 2 to 12 weight percent and preferably from 4 to 9 weight percent based on the weight of the dicarboxylic acid compound charged.

The most common polycondensation catalyst heretofore used has been antimony oxide. This catalyst, when used with a polyoxyalkylene glycol modifier, presents several problems due to the high temperatures and long reaction time required. It has been found that some decomposition of the polyoxyalkylene glycol often occurs causing discoloration of the polymer and, also, that a longer reaction time was needed when these modifiers were present. A further disadvantage was contamination with significant amounts of antimony which is known to cause an environmental pollution problem due to its toxicity. While one aspect of this invention does use antimony diglycollate as one of the catalyst components, its use is in much smaller amounts and hence much less objectionable. The use of the silicon compound hereinafter described with the polyoxyalkylene glycol modifiers has eliminated many of the problems heretofore encountered and has enabled the production of high molecular weight fiber-forming polyesters having good color at a much faster rate and over a shorter period of time, as shown in the examples.

The first type of coordination complex catalysts used in this invention is fully disclosed in U.S. Pat. No. 4,143,057, which is incorporated herein by reference, and comprises two essential components. The first component is a metal halide and the second component is one or more of the silicon compounds defined below.

The metal halides used to produce the coordination complexes useful as catalysts are the halides of the metals titanium, zirconium, zinc, germanium, tin, lead, antimony and bismuth. Illustrative of suitable metal halides one can include the di-, tri- and tetra-bromides, chlorides, fluorides and iodides of titanium and zirconium; the di-bromides, chlorides, fluorides and iodides of zinc; the di- and tetra-bromides, chlorides, fluorides and iodides of germanium, tin and lead including the mixed bromide-chlorides, bromide-iodides and chloride-iodides of tin; the tri- and penta-bromides, chlorides, fluorides and iodides of antimony; and the tri- and tetra-bromides, chlorides, fluorides and iodides of bismuth. These metal halides are well known to the average chemist and are fully enumerated in chemical handbooks to the extent that specific naming thereof is not necessary herein to enable one skilled in the art to know chemical names of the specific metal halides per se; see the Handbook of Chemistry and Physics, Chemical Rubber Publishing Co., publisher. The preferred metal halides are those of titanium.

In producing the coordination complexes useful as catalysts, the molar ratio of metal halide to silicon compound in the coordination complex can vary from about 1:0.5 to about 1:10; preferably from about 1:1 to about 1:7, and most preferably from about 1:1 to about 1:2.

The silicon compounds that are used in conjunction with the metal halide to produce the coordination complex catalyst of this invention are represented by the following generic formulas:

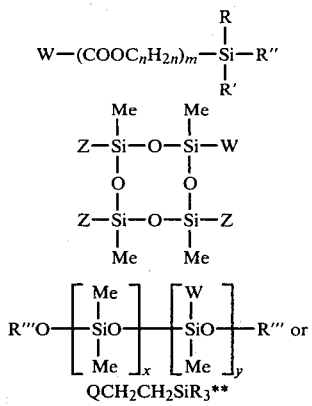

$$W-(COOC_nH_{2n})_m-\underset{\underset{R'}{|}}{\overset{\overset{R}{|}}{Si}}-R'' \qquad II$$

$$\begin{array}{c}\overset{Me}{|}\qquad\overset{Me}{|}\\Z-Si-O-Si-W\\|\qquad\quad|\\O\qquad\quad O\\|\qquad\quad|\\Z-Si-O-Si-Z\\|\qquad\quad|\\Me\qquad Me\end{array} \qquad III$$

$$R'''O-\left[\begin{array}{c}Me\\|\\SiO\\|\\Me\end{array}\right]_x\left[\begin{array}{c}W\\|\\SiO\\|\\Me\end{array}\right]_y-R''' \text{ or} \qquad IV$$

QCH$_2$CH$_2$SiR$_3$** V wherein
W is CH$_2$=CX— or

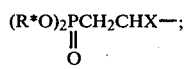

(R*O)$_2$$\overset{\overset{O}{\|}}{P}$CH$_2$CHX—;

X is hydrogen or methyl and is methyl only when m is one;
R* is alkyl or haloalkyl having from 1 to 4 carbon atoms;
R** is methyl, ethyl, butyl, acetoxy methoxy, ethoxy or butoxy;
R is methyl, ethyl, butyl, methoxy, ethoxy, butoxy, or trimethylsiloxy;
R' is methyl, methoxy, ethoxy, butoxy or trimethylsiloxy;
R'' is methoxy, ethoxy, butoxy, trimethylsiloxy or vinyldimethylsiloxy;
R''' is methyl, ethyl, butyl or trimethylsilyl;
Me is methyl;
Z is methyl or W;
Q is an NC$_2$CH—, NH$_2$CH$_2$CH$_2$NHCH$_2$—, NC—, HS— or HSCH$_2$CH$_2$S— group;
n is an integer having a value of from 2 to 5;
m is an integer having a value of zero or one;
x is an integer having a value of from 1 to 100; and
y is an integer having a value of from 1 to 100.

Subgeneric to II are the compounds represented by the following subgeneric formulas:

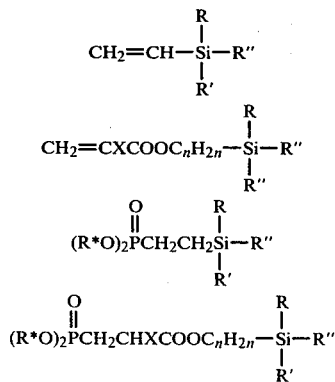

$$CH_2=CH-\underset{\underset{R'}{|}}{\overset{\overset{R}{|}}{Si}}-R'' \qquad IIA$$

$$CH_2=CXCOOC_nH_{2n}-\underset{\underset{R''}{|}}{\overset{\overset{R}{|}}{Si}}-R'' \qquad IIB$$

$$(R*O)_2\overset{\overset{O}{\|}}{P}CH_2CH_2\underset{\underset{R'}{|}}{\overset{\overset{R}{|}}{Si}}-R'' \qquad IIC$$

$$(R*O)_2\overset{\overset{O}{\|}}{P}CH_2CHXCOOC_nH_{2n}-\underset{\underset{R'}{|}}{\overset{\overset{R}{|}}{Si}}-R'' \qquad IID$$

Subgeneric to III are the compounds represented by the following subgeneric formulas:

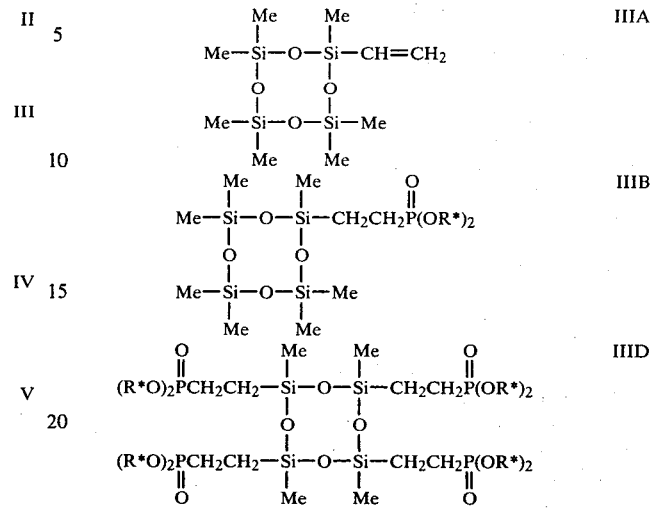

Illustrative of suitable silicon compounds one can mention the following: beta-cyanoethyl triethoxysilane, gamma-mercaptopropyl triethoxysilane, gamma-aminopropyl triethoxysilane, diethoxyphosphorylethyl methyl diethoxysilane, vinyl triethoxysilane, vinyl trimethoxysilane, vinyl triacetoxysilane, gamma-methacryloxypropyl trimethoxysilane, diethoxyphosphorylethyl heptamethyl cyclotetrasiloxane, trimethyl silyl terminated copolymer having dimethylsiloxy and methylvinylsiloxy units in the molecle, beta-cyanoethyl trimethylsilane, gamma-(2-aminoethyl)-aminopropyl triethoxysilane, S-beta(2-mercaptoethyl)mercaptoethyl triethoxysilane, betamercaptoethyl triethoxysilane, vinyl methyl diethoxysilane, vinyl methyl di(trimethylsiloxy)silane, tetramethyl divinyl disiloxane, heptamethyl vinyl cyclotetrasiloxane, 1,3,5,7-tetramethyl 1,3,5,7-tetravinyl cyclotetrasiloxane, diethoxyphosphorylethyl methyl diethoxysilane, diethoxyphosphorylisopropyl triethoxysilane, diethoxyphosphorylethyl methyl di(trimethylsiloxy)silane, heptamethyl diethoxyphosphorylethyl cyclotetrasiloxane, 1,3,5,7-tetramethyl 1,3,5,7-tetra-(diethoxyphosphorylethyl)cyclotetrasiloxane, 1,1,3,3-tetramethyl-1,3-di(ethoxyphosphorylethyl)disiloxane.

The second type of coordination complex catalysts that we have found useful comprises mixtures of the complexes of a metal halide and the above-identified silicon compounds with antimony diglycollate, as discussed in U.S. Pat. No. 4,116,942; such mixtures are useful in producing the polyesters modified with polyoxyalkylene glycols and the use of these three component catalyst complexes gives an equally satisfactory product as is obtained when using the two component complexes of the metal halides with the defined silicon compounds. In these mixtures the molar ratio of antimony diglycollate to silicon compound varies from 0.2:1 to about 2:1, or more, in the catalyst mixture, and it is preferably from about 0.2:1 to about 0.6:1.

In the polycondensation reaction the coordination catalyst complex is used at a concentration of from 0.01 to 0.02 weight percent, or higher, based on the weight of dicarboxylic acid compound charged, preferably from 0.02 to 0.06 weight percent. Any catalytically effective concentration can be employed. As used in this application the term "dicarboxylic acid compound" means both the free dicarboxylic acids and the esters thereof.

The dicarboxylic acid compounds used in the production of polyesters and copolyesters are well known to those skilled in the art and illustratively include terephthalic acid, isoterephthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkyl esters thereof that contain from 1 to about 5 carbon atoms in the alkyl groups thereof.

Suitable aliphatic glycols for the production of polyesters and copolyesters are the acyclic and alicyclic aliphatic glycols having from 2 to 10 carbon atoms, especially those represented by the general formula $HO(CH_2)_pOH$, wherein p is an integer having a value of from 2 to about 10, such as ethylene glycol, trimethylene glycol, tetramethylene glycol, and pentamethylene glycol, decamethylene glycol, and the like.

Other known suitable aliphatic glycols include 1,4-cyclohexanedimethanol, 3-ethyl-1,5-pentanediol, 1,4-xylylene glycol, 2,2,4,4-tetramethyl-1,3-cyclobutanediol, and the like. One can also have present a hydroxylcarboxyl compound such as 4-hydroxybenzoic acid, 4-hydroxyethoxybenzoic acid, or any of the other hydroxylcarboxyl compounds known as useful to those skilled in the art.

It is also known that mixtures of the above dicarboxylic acid compounds or mixtures of the aliphatic glycols can be used and that a minor amount of the dicarboxylic acid component, generally up to about 10 mole percent, can be replaced by other acids or modifiers such as adipic acid, sebacic acid, or the esters thereof, or with modifiers that imparts improved dyeability to the polymers. In addition one can also include pigments, delusterants or optical brighteners by the known procedures and in the known amounts.

The first stage esterification or transesterification reaction is carried out in the traditional manner by heating the mixture of carboxylic acids, aliphatic glycols and polyoxyalkylene glycol modifiers at from about 150° C. to about 270° C., preferably from about 175° C. to about 250° C. During this stage any of the well-known esterification or transesterification catalysts can be used; illustrative thereof one can mention zinc acetate, manganese acetate, cobaltous acetate, zinc succinate, zinc borate, magnesium methoxide, sodium methoxide, cadmium formate, and the like. The concentration thereof is that conventionally used, namely from about 0.001 to about one percent by weight, based on the weight of dicarboxylic acid compound charged. It is preferably from about 0.005 to about 0.5 percent by weight and more preferably from about 0.01 to about 0.2 percent by weight.

The polycondensation reaction is generally carried out at a temperature of from about 225° C. to about 325° C., preferably from about 250° C. to about 290° C. at reduced pressure and under an inert atmosphere. These traditional reaction conditions are well known to those skilled in the art.

In a typical reaction, the prescribed amounts of dicarboxylic acid compounds, diols, polyoxyalkylene glycol modifiers and catalysts are charged to the reactor. The reaction mixture is then heated in an inert gas atmosphere at a temperature of from 180° C. to 210° C. to effect the initial esterification or transesterification. Thereafter, excess diol is removed and the transesterification is completed by heating the reaction mixture at a temperature of from about 225° C. to about 235° C. The second stage polycondensation reaction is then carried out by heating the reaction mixture at a temperature of from about 225° C. to about 325° C. under a reduced pressure of from about 0.1 mm to about 20 mm. of mercury, preferably below about 1 mm.

The use of the silicon complexes defined above consistently produce polyoxyalkylene glycol-modified polyesters which had better strength and cold draw properties, and color in a shorter period of time then was required when antimony oxide was used as the polycondensation catalyst under similar conditions. Thus, it was found that at a 30 minutes polycondensation time, modified polyesters were produced having significantly higher molecular weights than similarly modified polyesters produced during the same reaction time when using antimony oxide catalyst. The fibers produced with the modified polyesters obtained by the processes of this invention showed excellent cold draw properties after shorter polycondensation periods and in many instances the color was better.

In the examples Catalyst A is a fifty weight percent toluene solution of the 1:1 molar complex of titanium tetrachloride and diethoxyphosphorylethyl methyl diethoxysilane. Catalyst B is the fifty weight percent ethylene glycol solution of equal amounts of antimony diglycollate and the 1:1 molar complex of titanium tetrachloride with diethoxyphosphorylethyl methyl diethoxysilane.

Molecular weights were calculated from the intrinsic viscosity of a 0.5 weight percent o-chlorophenol solution of the polyester measured at 25° C. using the Mark-Houwing equation for conversion to average molecular weights:

$$\eta = 1.7 \times 10^{-4} Mn^{0.83}$$

The following examples serve to illustrate the invention, parts are by weight unless otherwise indicated.

EXAMPLE 1

Run A

A mixture of 47 grams of dimethyl terephthalate, 37.6 grams of ethylene glycol, 3.3 grams of polyoxyethylene glycol in which n of Formula I had an average value of about 32, 0.012 gram of manganese acetate and 0.052 gram of Catalyst B was charged to a polymerization reactor. A slow stream of argon was passed through the mixture which it was heated for three hours at 185° C. During this time the transesterification reaction took place and methanol was distilling. The temperature was raised to 230° C. and maintained for one hour. It was then increased to 280° C. while the pressure was gradually reduced, to remove excess ethylene glycol. The polycondensation period is considered to start at the time the temperature reached 280° C.

The polycondensation was continued at 280° C. and a pressure of 0.5 mm. Hg for thirty minutes to produce a modified polyester having an average molecular weight of 15,000. The polyester produced white fibers with very good to excellent cold draw properties; using conventional fiber producing procedures.

Run B

Run A was repeated using 0.052 gram of Catalyst A. After a 30 minutes polycondensation period the polyester produced had an average molecular weight of 22,000. It was extruded and produced strong, white fibers that had very good to excellent cold draw properties.

Run C

For comparative purposes a polyesterification was carried out repeating Run A but using 0.022 gram antimony trioxide, the conventional catalyst, as the polycondensation catalyst. After a 30 minutes polycondensation period the polyester produced had an average molecular weight of only 9,000. Fibers produced with this polyester were very weak, yellowish and had very poor cold draw properties.

The results show that by use of the process of this invention one produces a higher molecular weight polyester at a faster reaction rate and that the fibers have better properties.

EXAMPLE 2

Run A

A polyesterification was carried out following the same procedure described in Run B of Example 1 differing solely in that amount of polyoxyethylene glycol employed was 1.9 grams. The polyester produced after a 30 minutes polycondensation period had an average molecular weight of more than 25,000. It was extruded to produce a very strong white fiber with good to very good cold draw properties.

Run B

For comparative purposes a polyesterification was carried out repeating Run A but using 0.022 gram of antimony trioxide as the polycondensation catalyst. At the end of a 30 minutes polycondensation period the polyester had an average molecular weight of only 14,850; fibers produced with this polyester were weak with very poor cold draw properties. Polycondensation was continued for another 30 minutes and at the end of a total polycondensation period of 60 minutes the polyester had an average molecular weight of only 16,225; the fibers produced from this polyester were also weak with poor cold properties.

The results in Runs A and B of this example show that under identical conditions higher molecular weight polyester and very good fibers with very good cold draw properties are produced by the process of this invention as compared to the polyester produced using the heretofore employed catalysts even at longer polycondensation times.

EXAMPLE 3

Run A

The same procedure and quantities used in Run A of Example 1 were employed to produce a polyester differing solely in that the polyoxyethylene glycol that corresponded to Formula I had an average n value of 21. After a 30 minutes polycondensation period, the polyester produced had an average molecular weight of over 22,500. The fibers extruded from this polyester were white and had good cold draw properties.

Run B

Following the same procedure used in Run A above a polyester was produced using 0.022 gram antimony trioxide as the catalyst. After a 30 minutes polycondensation period the polyester had an average molecular weight of only 12,000; after 60 minutes it was only 13,200. In both instances the fibers produced were very weak and had poor cold draw properties.

The results show that fibers produced from polyester manufactured using antimony trioxide as the catalyst had poor properties even after 60 minutes polycondensation period as compared to fiber produced under identical conditions with Catalyst B at only a 30 minutes polycondensation period.

EXAMPLE 4

Run A

Following the procedure described in Run A of Example 3, a polyester was produced using Catalyst A and only 1.9 grams of the same polyoxyethylene glycol modifier. After a 30 minutes polycondensation period the polyester had an average molecular weight of over 25,000. A white strong fiber was produced having good to very good cold draw properties.

Run B

Run A was repeated using as the catalyst, Catalyst B. After a 30 minutes polycondensation time the polyester had an average molecular weight of 22,500 and the fibers produced were white, strong and had a very good to excellent cold draw.

Run C

Run A was repeated using 0.0228 of antimony trioxide as the catalyst. After a 30 minutes polycondensation period the polyester produced had an average molecular weight of only 12,000. Fibers produced from this polyester were weak and had poor cold draw properties.

EXAMPLE 5

Run A

The catalyst and procedure followed were those set forth in Run B of Example 1, the difference being the use of a polyoxyethylene glycol in which n of Formula I had an average value of about 12. After a thirty minutes polycondensation, time, the polyester had an average molecular weight of 13,200; good fibers were produced having fair cold draw properties. After a 60 minutes polycondensation period the average molecular weight of the polyester was 15,400 and again the cold draw properties were fair.

Run B

Run A was repeated differing only in that Catalyst B was employed. After a 30 minutes polycondensation period the average molecular weight of the polyester was 16,500 and fibers produced therefrom had fair to good cold draw properties. After a 60 minutes polycondensation time the average molecular weight of the polyester was 24,500 and the fibers produced had good cold draw properties.

Run C

Run A was repeated using 0.022 gram of antimony trioxide as the catalyst. After a 30 minutes polycondensation period, the average molecular weight of the polyester was 12,000; a weak fiber was extruded with no cold draw properties. After a 60 minutes polycondensation period the average molecular weight of the polyester was 14,000; weak fibers were produced having poor cold draw properties.

EXAMPLE 6

Run A

Polyester was produced as described in Run A of Example 5 using only 1.9 grams of the same polyoxyethylene glycol modifier. After a 30 minutes polycondensation period, the polyester had an average molecular weight of over 25,000. It produced a white, very strong fiber, with good cold draw properties.

Run B

Run A was repeated using Catalyst B. After a 30 minutes polycondensation period, the average molecular weight was 21,000; the polyester produced extruded to a very good strong fiber having good to excellent cold draw properties.

Run C

Run A was repeated using 0.022 gram of antimony trioxide. After a 30 minutes polycondensation period, the polyester produced had an average molecular weight of only 12,000. When extruded to a fiber it produced a weak fiber having only fair cold draw properties. After a 60 minutes polycondensation period the average molecular weight of the polyester was only 13,000 and fibers produced were weak and had only good cold draw properties.

EXAMPLE 7

Run A

Run A of Example 1 was repeated using a polyoxyethylene glycol modifier in which n of Formula I had an average value of about 312. After a 30 minutes polycondensation period, the average molecular weight of the polyester produced was 13,000. A very good fiber was produced having very good cold draw properties and good color.

Run B

Run A was repeated using 0.022 gram antimony trioxide as the catalyst. After a 30 minutes polycondensation period the average molecular weight was 9,900, after 60 minutes it was 11,000. In both of these instances the fibers produced were weak with poor cold draw properties.

EXAMPLE 8

Run A

Run B of Example 1 was repeated using polyoxypropylene glycol modifier in which n of Formula I had an average value of about six. After a thirty minutes polycondensation period the polyester produced had an average molecular weight of 17,600. Fibers produced were strong with very good cold draw properties.

Run B

Run A was repeated using 0.022 gram antimony trioxide as the catalyst. After a 30 minutes polycondensation period the average molecular weight of the polyester was 11,300. It produced weak fibers having poor to fair cold draw properties.

EXAMPLE 9

Run A

Run B of Example 1 was repeated using a polyoxyethylene glycol modifier in which n of Formula I had an average value of about 2,250. After a 30 minutes polycondensation period, the average molecular weight of the polyester produced was 18,100. Good fibers were produced from this polyester having fair to good cold draw properties.

Run B

Run A was repeated using 0.022 gram of antimony trioxide as the catalyst. After a 30 minutes polycondensation period the average molecular weight was only 12,700. The polyester produced fibers having poor cold draw properties.

EXAMPLE 10

Run A

Run B of Example 1 was repeated using a copoly(oxyethylene-oxypropylene) glycol modifier having an average molecular weight of about 1,630 wherein the molar ratio of oxyethylene:oxypropylene units is 1:4. After only a 15 minutes polycondensation period a polyester was obtained having an average molecular weight of 16,500. This polyester produced good fibers having good to very good cold draw properties.

Run B

Run A was repeated using 0.022 gram antimony trioxide as the catalyst. After a 30 minutes polycondensation period the average molecular weight was 15,400. Fibers produced from this polyester had only fair to good cold draw properties.

What we claim is:

1. A process for the catalytic manufacture of solid fiber forming polyesters of dicarboxylic acid compounds and aliphatic glycols modified with from 2 to 10 weight percent of a polyoxyalkylene glycol of the general formula:

wherein X is hydrogen or methyl and n has an average value of from 4 to 250,000 when X is hydrogen and an average value of from 4 to 1,000 when X is methyl, in contact with a catalytic amount sufficient to catalyze the reaction of (I) a coordination complex catalyst composition of (A) and (C) or (II) the coordination complex catalyst of (A), (B) and (C); wherein:

(A) is a metal halide of a metal selected from the group consisting of titanium, zirconium, zinc, germanium, tin, lead antimony and bismuth;

(B) is antimony glycollate;

(C) is a silicon compound selected from the group consisting of:

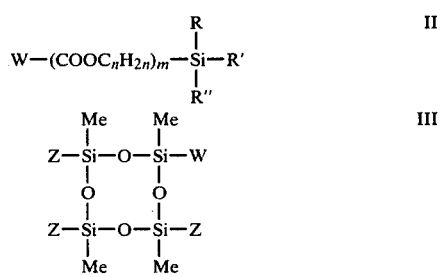

-continued

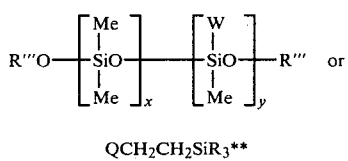   IV

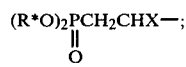   V wherein

W is $CH_2=CX-$ or $$(R^*O)_2\underset{\underset{O}{\|}}{P}CH_2CHX-;$$

X is hydrogen or methyl and is methyl only when m is one;

R* is alkyl or haloalkyl having from 1 to 4 carbon atoms;

R** is methyl, ethyl, butyl, acetoxy, methoxy, ethoxy or butoxy;

R is methyl, ethyl, butyl, methoxy, ethoxy, butoxy or trimethylsiloxy;

R' is methyl, methoxy, ethoxy, butoxy or trimethylsiloxy;

R" is methoxy, ethoxy, butoxy, trimethylsiloxy or vinyldimethylsiloxy;

R''' is methyl, ethyl, butyl or trimethylsilyl;

Me is methyl;

Z is methyl or W;

Q is an $NH_2CH_2-$, $NH_2CH_2CH_2NHCH_2-$, $NC-$, $HS-$ or $HSCH_2CH_2S-$ group;

n is an integer having a value of from 2 to 5;

m is an integer having a value of zero or one;

x is an integer having a value of from 1 to 100; and y is an integer having a value of from 1 to 100;

and wherein the mole ratio of (A):(C) is from 1:0.5 to 1:10 and the mole ratio of (B):(C) is from 0.2:1 to 2:1 in said coordination complex catalyst composition.

2. A process as claimed in claim 1 wherein n has an average value of from 4 to 5,000 when X is hydrogen.

3. A process as claimed in claim 1 wherein n has an average value of from 4 to 800 when X is hydrogen.

4. A process as claimed in claim 1 wherein n has an average value of from 6 to 500 when X is methyl.

5. A process as claimed in claim 1 wherein said polyoxyalkylene glycol is polyoxyethylene glycol having an average molecular weight of from about 570 to about 1,000,000.

6. A process as claimed in claim 1 wherein said polyoxyalkylene glycol is polyoxypropylene glycol having an average molecular weight of from about 425 to about 4,000.

7. A process as claimed in claim 1 wherein said polyoxyalkylene glycol is a copoly(oxyethylene-oxypropylene) glycol having an average molecular weight of from about 200 to about 20,000.

8. A process as claimed in claim 1 wherein said polyoxyalkylene glycol is present at a concentration of from 4 to 7 weight percent.

9. A process as claimed in claim 1 wherein said dicarboxylic acid compound is dimethyl terphthalate and said aliphatic glycol is ethylene glycol.

10. A process as claimed in claim 9 wherein said polyoxyalkylene glycol is polyoxyethylene glycol having an average molecular weight of from about 570 to about 1,000,000.

11. A process as claimed in claim 9 wherein said polyoxyalkylene glycol is polyoxypropylene glycol having an average molecular weight of from about 425 to about 4,000.

12. A process as claimed in claim 9 wherein said polyoxyalkylene glycol is a copoly(oxyethylene-oxypropylene) glycol having an average molecular weight of from about 200 to about 20,000.

* * * * *

UNITED STATES PATENT AND TRADEMARK OFFICE
CERTIFICATE OF CORRECTION

PATENT NO. : 4,254,241
DATED : March 3, 1981
INVENTOR(S) : Kurt Weinberg and Gordon C. Johnson It is certified that error appears in the above—identified patent and that said Letters Patent is hereby corrected as shown below:

Col. 6, line 11, "then" should read --than--.

Col. 6, line 50, "which" should read --while--.

Col. 7, line 43 (Example 2 - Run B), after "cold" insert --draw--.

Signed and Sealed this

Sixth Day of October 1981

[SEAL]

Attest:

GERALD J. MOSSINGHOFF

Attesting Officer     Commissioner of Patents and Trademarks